A. C. G. SMITH & E. H. J. C. GILLETT.
VARIABLE SPEED AND REVERSING GEARING.
APPLICATION FILED AUG. 5, 1908.

924,847.

Patented June 15, 1909.
3 SHEETS—SHEET 1.

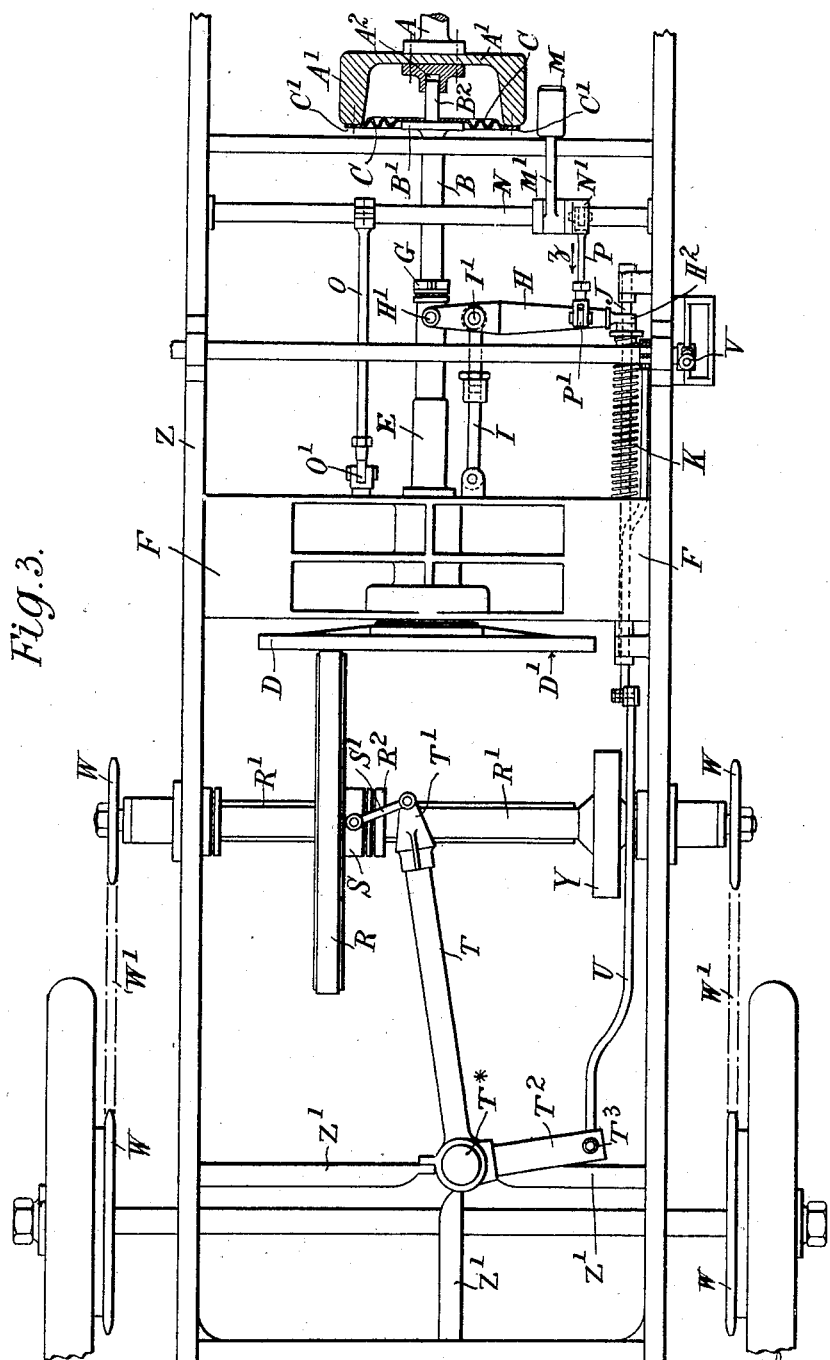

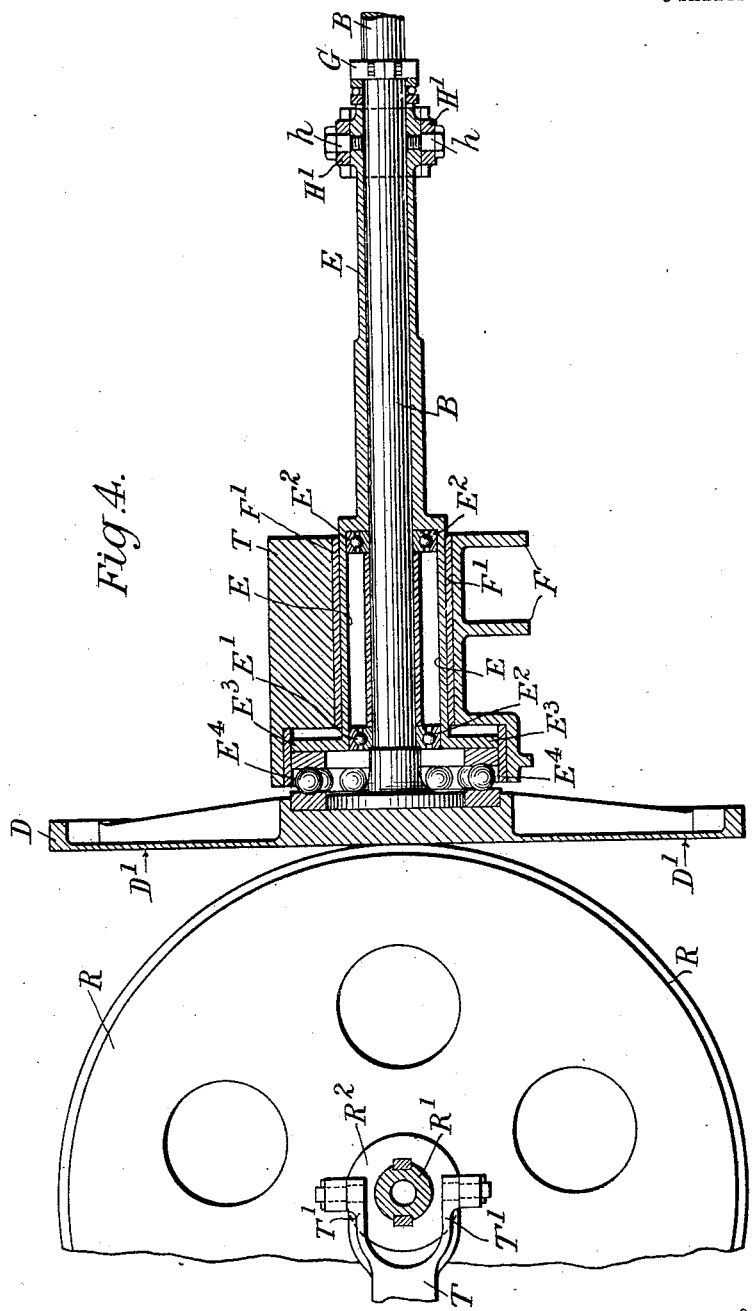

UNITED STATES PATENT OFFICE.

ARTHUR CYRIL GODWIN SMITH, OF LONDON, AND EDWARD HENRY JAMES CECIL GILLETT, OF HOUNSLOW, ENGLAND.

VARIABLE-SPEED AND REVERSING GEARING.

No. 924,847.      Specification of Letters Patent.      Patented June 15, 1909.

Application filed August 5, 1908. Serial No. 447,136.

*To all whom it may concern:*

Be it known that we, ARTHUR CYRIL GODWIN SMITH, engineer, residing at 29 Primrose Mansions, Battersea Park, London, England, and EDWARD HENRY JAMES CECIL GILLETT, engineer, residing at Hounslow, Middlesex, England, and whose post-office address is Inverness Works, Inverness Road, Hounslow, Middlesex, England, both subjects of the King of Great Britain, have invented certain new and useful Improvements in or Relating to Variable-Speed and Reversing Gearing, of which the following is a specification.

This invention has for its object improvements in or relating to variable speed transmission gear—applicable also as reversing gear—for motor road vehicles provided with internal combustion motors, or said invention may be used for any other purpose to which same may be applicable.

The present invention relates to variable speed transmission gear of the type in which the periphery of a friction roller and the flat surface of a friction disk are brought into frictional contact (at any desired point on the friction disk) to thereby impart variable speed to the said friction roller, and according to the present invention the friction disk is fixed on a shaft hereinafter referred to as the disk shaft which disk shaft is specially mounted as hereinafter described and is in alinement with the motor shaft with flexible coupling means, or a flexible device, for uniting the proximate ends of said two shafts interposed between said motor and disk in suchwise as to permit of the disk and disk shaft being moved (within certain limits) toward or away from the motor while insuring the rotary movement of the friction disk and disk shaft synchronously with the motor shaft. By the aforesaid flexible coupling means or flexible device we mean and intend to include any suitable flexible coupling means interposed between the disk shaft and the motor shaft and arranged to act in suchwise as to enable the aforesaid movement of the disk and its shaft toward or away from the motor while the two shafts practically form and remain as one shaft in so far that they can only rotate together.

We will now proceed to fully describe the present invention and in order that same may be the more easily understood and readily carried into practice we will fully describe same with reference to the accompanying drawings.

Figure 1:
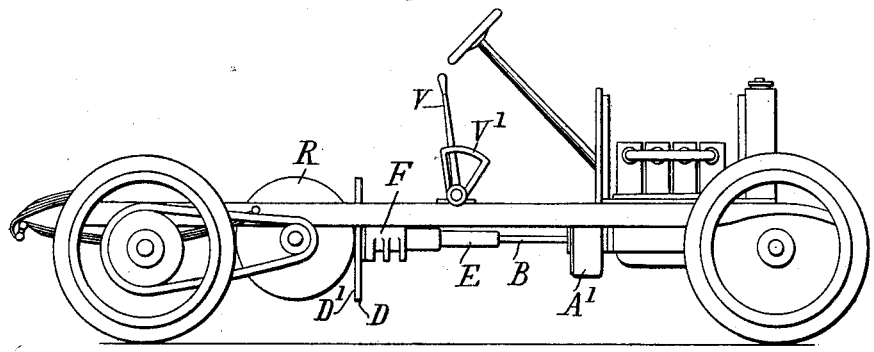
Figure 2:
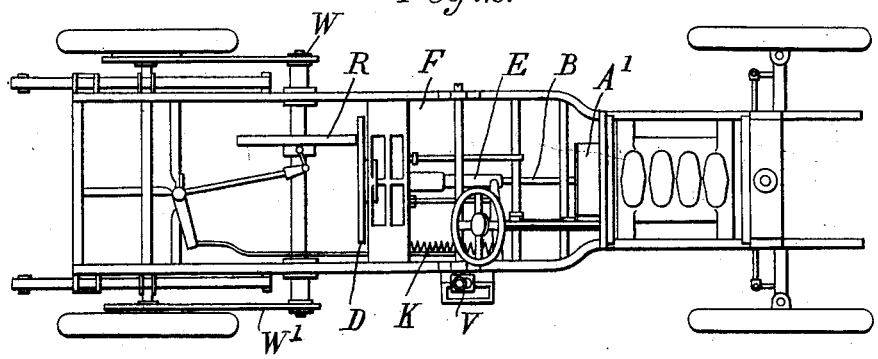

Figure 1 is a diagrammatic side view of a motor car chassis showing the present invention applied thereto. Fig. 2 is a plan view of Fig. 1. Fig. 3 is a plan view on an enlarged scale of part of the chassis showing the present invention applied thereto. Fig. 4 is a detail plan view partly in section—on a still more enlarged scale—of the rotary disk shaft and the hollow shaft or controlling sleeve in which said disk shaft is mounted as hereinafter described.

Similar letters of reference indicate corresponding parts throughout.

On the end of one shaft, say the motor shaft A is fixed a flanged drum or fly wheel $A^1$ (of any suitable type *e. g.* such as the fly wheel at present employed) and on the proximate end of the disk shaft B is rigidly fixed a corrugated metal disk or ring C the periphery or outer part of which at $C^1$ is fixed to the aforesaid fly wheel (or a hollow drum or flanged wheel) $A^1$ on the mtor shaft A; while the inner periphery of or inner part of said corrugated disk or ring C is immovably fixed to a flange or collar $B^1$ (or other means) on the proximate end of the disk shaft B.

The engine shaft A terminates and is firmly secured to such flanged drum or fly wheel $A^1$ which on the inner side is provided with a cylindrical recess $A^2$ in which the round proximate end $B^2$ of the disk shaft B can slide endwise within a limited distance. Thus rotary movement of the motor shaft A is positively transmitted through the fly wheel $A^1$ and said corrugated metal disk or ring C to the disk shaft B while at same time permitting the endwise movement (within certain limits) of said disk shaft B toward or away from the motor shaft A—the corrugations of such corrugated disk or ring C permitting said endwise movement. If desired the corrugated disk C may be provided with slots or cut-away portions between the margins where it is secured respectively to the collar $B^1$ and the flanged drum $A^1$, thus giving the corrugated disk somewhat the appearance of the spokes of a wheel; or if desired the disk may be divided into a number of radial sections or sectors corrugated in a similar manner to the disk C, or otherwise suitably formed, and so mounted as to form flexible coupling arms to act in the same manner as and in substitution for the corrugated disk C.

The friction disk shaft B and the friction disk D thereon are arranged and mounted and are operated according to the present invention as follows:—The friction disk D is fixed to its shaft B (in any suitable manner and by any suitable means) in suchwise as to leave the outer face or plane $D^1$ of the friction disk D flush; and the shaft B extends from the back of said friction disk D (to which it is strongly secured) to the point where it is flexibly coupled to the motor shaft A as aforesaid; and, between the said friction disk D and said flexible coupling, the friction disk shaft B passes through a long controlling sleeve or hollow box or hollow shaft E, and at suitable points such as $E^1$ $E^2$ the said friction disk shaft B is journaled or has bearings (such as ball bearings) provided therein and thereon. The end of said hollow shaft or box or sleeve E (hereinafter referred to as the controlling sleeve E) where same adjoins the friction disk D is enlarged at $E^3$ or is of such size or so arranged as to be adapted to contain or carry any suitable thrust bearing such as a ball race $E^4$ or other suitable bearing, adapted to withstand the thrust of or on the friction disk D; the said controlling sleeve E etc., being suitably mounted (in the stout cross-bar F fixed rigidly in the frame work Z of the chassis) so as to be prevented from revolving while capable of longitudinal movement synchronously with the aforesaid endwise movement of the friction disk shaft B and said disk D thereon toward or away from the motor; e. g. said controlling sleeve E may be mounted so as to fit and slide through a bearing formed in a bracket $F^1$ or other suitable part of or fixed to the frame of the car, which bracket or part $F^1$ being fixed to the cross-bar F is immovable and is provided with means such as a "feather" or "spline" to prevent the rotation of said controlling sleeve E while permitting endwise movement of the latter as aforesaid.

Toward that end of the friction disk shaft B which is flexibly coupled to the motor shaft A as aforesaid, we fix a collar G (Figs. 3 and 4) on said shaft B, close against the end of the controlling sleeve E through which said friction disk shaft B passes as aforesaid; so that while said shaft B is free to revolve (with the disk at one end and the collar G fixed toward the other end as aforesaid) within the controlling sleeve E which is held stationary (i. e. non-rotatably) nevertheless when endwise movement is imparted to said controlling sleeve E by any suitable means (such as herein described) such endwise movement will, by means of said thrust bearing ($E^3$ $E^4$) at one end of the controlling sleeve E and the fixed collar G at the other end of said controlling sleeve E, thereby be transmitted to the friction disk shaft B and friction disk D thereon, so that all these parts (as a system) will be moved endwise together (in either direction) the flexible coupling C permitting this endwise movement. Any suitable means may be employed for imparting said endwise movement to said controlling sleeve E and thereby to the disk shaft B and to the friction disk D; for example as follows:— The lever H is fulcrumed at $I^1$ to the adjustable fulcrum rod or adjustable support I for said lever H, which latter is forked at the end $H^1$ where it engages and is pivotally secured by the screws $h$ to the controlling sleeve E while the other end $H^2$ of said lever H (through which end $H^2$ the rod J slides) is acted on by the compressed spring K so that the tendency of said spring K to expand normally serves through the lever H and the controlling sleeve E to force the disk shaft toward and against a friction roller R with the desired amount of pressure. Any suitable means are provided to adjust and set said spring K so as to increase or diminish the amount of compression of said spring and thereby increase or diminish the amount of pressure by which the disk D is forced toward and against the friction roller R so as thus to keep the surfaces of said disk and roller R pressed together with the exact amount of pressure desired.

In addition to the aforesaid means (not shown) for adjusting and setting the normal amount of compression of the spring K; as it may be necessary in some cases (as for instance when a special effort is required for getting the car out of soft ground or out of a hollow or up a very steep incline) to momentarily, or for any desired time, to greatly increase the amount of pressure by which the disk D is forced against the friction roller R we may therefore provide any suitable means for increasing to any desired degree (above the normal) the pressure exerted by said spring K and consequently the pressure of the friction disk D upon the friction roller R; for example this may be accomplished by means of a side lever which is so coupled up to the rear end of the spring K that when said lever is moved a few notches it further compresses the spring K beyond the normal compression to which it is set by any suitable adjusting means.

The lever H is operated in any suitable manner by the person in charge of the vehicle and advantageously by means of a foot pedal M which is connected and operates said lever H as follows:—The arm $M^1$ carrying the foot pedal M is rigidly fixed to the pedal shaft N which is journaled in the framework Z of the chassis and advantageously braced or supported by the intermediate support or tie rod O which is pivoted at $O^1$ to the stout cross-bar F. A connecting rod P is pivoted at one end $P^1$ to the lever H and at its other end is connected to the crank $N^1$ on the pedal shaft N so that when the pedal is depressed the connecting rod P will be forced in the direction of the arrow $z$ and thereby will move the end $H^2$ of the lever in the direction of the arrow $z$ and thus the controlling sleeve E will move the disk shaft B and disk D thereon away from the friction roller R against the action of the spring K which latter on release of the foot pedal M will then serve to return the disk G against the friction roller with the desired amount of pressure.

Any suitable means may be provided to enable the friction wheel or roller R to be moved along the shaft or axle $R^1$ thereof (mounted transversely across the chassis) so as to cause said friction roller R to be moved across the plane of said friction disk D and to be held and retained in position at any desired point relatively to said disk D and thus variable speeds may be imparted to said friction roller R.

In the arrangement illustrated in the drawings the friction roller R has a loose ball-thrust collar S mounted on the hub $R^2$ of said roller R and this loose collar S is connected by a bridle or links $S^1$ (see Fig. 3) to the forks or forked end $T^1$ of a bell-crank lever T which bell-crank T is pivoted at $T^\times$ to a fixed part $Z^1$ of the chassis Z and the other end $Z^2$ of this bell-crank has a rod U pivoted thereto at $T^3$ this rod being connected to a suitable hand lever V (see Figs. 1 2 and 3) which hand lever has a quadrant $V^1$ or other suitable means arranged to act in conjunction therewith so that the hand lever V can be moved to and readily locked in any position to which it is desired to fix same and also adapted to release said lever and allow same to be moved into and locked in any fresh position as and when desired. Said friction roller R and the shaft or axle $R^1$ thereof may be reversed by moving the former across the center of said friction disk D. From this shaft or axle $R^1$ of the friction roller R motion is transmitted to any desired point direct or otherwise to the driving wheels of the motor car by any suitable gear as for example by means of sprocket wheels W and chains $W^1$; and we advantageously introduce the ordinary or any suitable differential gear or compensating box Y in the shaft or axle $R^1$ of said friction roller R.

In operation it will be found advisable, when it is desired to move the friction roller R across the plane of the friction disk D to first move the latter away from the friction roller (i. e. toward the engine) and then after placing the friction roller R into the desired position relatively to the center of the friction disk D, the latter is then returned or allowed to return into frictional contact with said friction roller against which it is normally kept pressed with sufficient force by any suitable means such as an adjustable spring as aforesaid.

In carrying this invention into practice, we find it advantageous to form the coupling in suchwise that the flexible connection movement or endwise movement between the parts of the coupling is removed as far as possible—or to a considerable distance—from the axis of the said shafts.

We are aware that heretofore it has been proposed to employ a friction wheel in frictional contact with a friction disk, with said friction wheel capable of being moved across the plane of the latter for the purpose of varying speed.

What we claim is:—

1. In a variable speed gear, the combination of a driving shaft, a driven shaft, a corrugated disk operatively connecting said shafts and means for adjusting said driven shaft toward and away from said driving shaft, substantially as described.

2. In a variable speed gear, the combination of a shaft, a friction wheel slidably mounted thereon, means for adjusting said wheel on said shaft, a driving shaft, a driven shaft, a friction disk thereon, a spring and connections normally holding said disk and wheel together, a corrugated disk operatively connecting said driving and driven shafts and means for moving said friction disk out of contact with said friction wheel, substantially as described.

3. In a variable speed gear, the combination of a shaft, a friction wheel slidably mounted thereon, a driving shaft, a fly-wheel thereon, a driven shaft a friction disk thereon normally in contact with said friction wheel, a corrugated disk connected to said fly-wheel and said driven shaft, and means for moving said driven shaft toward said driving shaft, substantially as described.

4. In a variable speed gear, the combination of a shaft, a friction wheel slidably mounted thereon and keyed thereto, means for moving said wheel along said shaft, a driving shaft, a fly-wheel thereon recessed on one face, a driven shaft, a friction disk thereon, a spring and connections for normally holding said disk in contact with said friction wheel, a corrugated disk connecting said fly-wheel and said driven shaft and means for moving said driven shaft toward said driving shaft, against the tension of said spring, substantially as described.

In testimony whereof we have hereunto set our hands in the presence of two witnesses.

ARTHUR CYRIL GODWIN SMITH.
EDWARD HENRY JAMES CECIL GILLETT.

Witnesses:
H. D. JAMESON,
F. L. RANDS.